US009178754B2

United States Patent
Vaidya et al.

(10) Patent No.: US 9,178,754 B2
(45) Date of Patent: Nov. 3, 2015

(54) METHOD AND SYSTEM FOR ANOMALY DETECTION AND PRESENTATION

(75) Inventors: Sachin M. Vaidya, Sunnyvale, CA (US); Venkeepuram R. Satish, Fremont, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 508 days.

(21) Appl. No.: 12/856,157

(22) Filed: Aug. 13, 2010

(65) Prior Publication Data
US 2012/0042255 A1    Feb. 16, 2012

(51) Int. Cl.
*G06F 15/177*    (2006.01)
*H04L 12/24*    (2006.01)

(52) U.S. Cl.
CPC .......... *H04L 41/0677* (2013.01); *H04L 41/508* (2013.01)

(58) Field of Classification Search
CPC .......... G06F 2201/875; G06F 11/3006; G06F 11/324; G06F 11/328; G06F 21/604; G06F 11/321; G06F 11/323; G06F 11/3447; H04L 47/326; H04L 67/22; H04L 67/1008; H04L 41/0893; H04L 43/00; H04L 67/1029; H04L 67/1031
See application file for complete search history.

(56) References Cited

U.S. PATENT DOCUMENTS

| | | | |
|---|---|---|---|
| 6,801,949 B1 * | 10/2004 | Bruck et al. | 709/232 |
| 2008/0098110 A1 * | 4/2008 | Takeda et al. | 709/224 |
| 2008/0134046 A1 * | 6/2008 | Gray et al. | 715/736 |
| 2008/0270845 A1 * | 10/2008 | Petersen et al. | 714/45 |

* cited by examiner

*Primary Examiner* — Boris Pesin
*Assistant Examiner* — Ayesha Huertas Torres
(74) *Attorney, Agent, or Firm* — Wilmer Cutler Pickering Hale and Dorr LLP

(57) ABSTRACT

A system and method for anomaly detection and presentation. The method of anomaly detection and presentation comprises receiving information for a plurality of traits from a plurality of servers. A first server has fewer of the plurality of traits than a second server. A first trait is on fewer of the plurality of servers than a second trait. The plurality of servers is rendered in a graphical display wherein the first server is positioned to one side of the second server based on respective numbers of traits had by the first and second servers. The first trait is rendered in the graphical display to one side of the second trait based on respective numbers of systems having the first and second traits. A table may be displayed in a cell in response to a user request. Anomalous traits may be displayed in an anomaly table.

19 Claims, 12 Drawing Sheets

METHOD AND SYSTEM FOR ANOMALY DETECTION AND PRESENTATION

FIELD

Embodiments according to the present invention generally relate to computer systems, in particular to systems that have a plurality of files that are administered across a plurality of computers.

BACKGROUND

Organizations use large numbers of computers that are typically grouped together according to their main usage. For example, servers may be grouped according to clusters, business units, or other designations. System administrators maintain the grouped computers. One of the goals of the system administrators is to ensure that the computers within a group have similarly installed packages and patches.

One method of doing installations across large numbers of computers and/or large numbers of groups is to use automated tools. The automated tools help to maintain uniformity within groups. Thus, the packages that are installed are identical on all computers within a group.

In order to maintain the computers, the administrators sometimes need to fix, tweak, patch, etc. the computers. This maintenance can cause individual computers to change their configurations and installations. Thus, computers end up having installations that are different from one another.

Identification of the various configurations of the individual computers across groups can be determined by manually inspecting the versions and installations. Unfortunately, there is a tremendous amount of data to maintain regarding the installations on each computer, especially in the case where there are many groups. This amount of information can be overwhelming, making it incredibly difficult for an administrator to manually identify anomalies within computer groups.

After an anomaly is identified, an administrator must then figure out what should be done to correct the anomaly. Again, there is a tremendous amount of data to analyze across the computers and across groups, in order to determine what action needs to be taken to correct the anomaly. Furthermore after the anomaly is corrected, the administrator must again survey the computers and groups to check for uniformity.

SUMMARY

Embodiments of the present invention are directed to a method and system for anomaly detection and presentation regarding software installed packages on computer systems. In one embodiment, a method of installed software anomaly identification includes: collecting information for a plurality of installations from a plurality of systems; displaying representations of said plurality of systems on a two dimensional grid, wherein said plurality of systems are sorted along a first dimension wherein a system with fewer of said plurality of installations is automatically displayed toward one side of said first dimension compared to a second system having more of said plurality of installations; displaying representations of said plurality of installations on said two dimensional grid, wherein said plurality of installations is sorted along a second dimension wherein a first installation which is on fewer of said plurality of systems is automatically displayed toward one side of said second dimension compared to a second installation which is on more of said plurality of systems; and displaying a matrix of cells corresponding to intersections of said plurality of systems and said plurality of installations.

In some embodiments representations of the plurality of systems are visually grouped into a plurality of groups. In some embodiments, the matrix of cells is color-coded to represent the information for the plurality of installations. In some embodiments, the plurality of installations includes at least one of a plurality of packages, a plurality of patches, and a plurality of programs.

In some embodiments, in response to user interaction with the grid, additional information is displayed within a cell in the matrix of cells. In some embodiments the additional information displayed includes systems status, package status, links to object pages, install links and/or uninstall links related to a user selected cell. In some embodiments, the method of anomaly identification includes identifying an anomalous system and displaying the anomalous system in an entry in a table, wherein the entry also includes information for resolving the anomalous system.

In another embodiment, a method of characteristic presentation includes: receiving information for a plurality of traits from a plurality of servers, wherein a first server has fewer of the plurality of traits than a second server, and a first trait is on fewer of the plurality of servers than a second trait; rendering a graphical display wherein the first server is positioned to one side of the second server along a first dimension based on respective numbers of traits had by the first and second servers; rendering within the graphical display the first trait to one side of the second trait along a second dimension based on respective numbers of systems having the first and second traits; and rendering within the graphical display an array of cells corresponding to intersections of the plurality of servers and the plurality of traits.

In some embodiments the plurality of servers are visually grouped according to clusters, business groups, or user defined custom groupings. In some embodiments, within the array of cells an installed trait is color-coded a first color, a trait that is not installed is color coded a second color, and a version mismatched trait is color-coded a third color. In some embodiments, receiving information for the plurality of traits includes receiving information for at least one of a plurality of health checks, a plurality of compliance metrics, a plurality of packages, a plurality of patches, and a plurality of programs.

In some embodiments, in response to a user request, a table is displayed illustrating anomalies of the plurality of servers. In some embodiments the displaying of the table includes displaying at least one of health checks, compliance metrics, system status, package status, links to object pages, install links, and uninstall links. In some embodiments, the method of characteristic presentation includes identifying an anomalous trait, and displaying the anomalous trait in an entry of a table wherein the entry further includes resolution of the anomalous trait.

In another embodiment, a system is described including: a processor; memory coupled to the processor, wherein the memory includes instructions that when executed cause the system to perform a method of anomaly identification, the method including: collecting information for a plurality of installations from a plurality of systems; displaying representations of said plurality of systems on a two dimensional grid, wherein said plurality of systems are sorted along a first dimension according to a respective amount of installations on each system; displaying representations of said plurality of installations on said grid, wherein said plurality of installations are sorted along a second dimension according to a respective amount of systems having each installation; and displaying a plurality of cells corresponding to intersections of said plurality of systems and said plurality of installations.

In some system embodiments, the system integrated method further includes visually grouping representations of the plurality of systems into a plurality of groups. In some system embodiments, the method further includes color-coding said plurality of cells to represent said information for said plurality of installations. In some system embodiments, the plurality of installations includes at least one of a plurality of packages, a plurality of patches, and a plurality of programs.

In some system embodiments, the system integrated method further includes displaying additional information within a selected cell in the grid, in response to user interaction with the grid. In some system embodiments, additional information displayed includes systems status, package status, links to object pages, install links and/or uninstall links related to a user selected cell. In some system embodiments, the system integrated method further includes identifying an anomalous system and displaying the anomalous system in an entry in a table wherein the entry also includes information for resolving the anomalous system.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
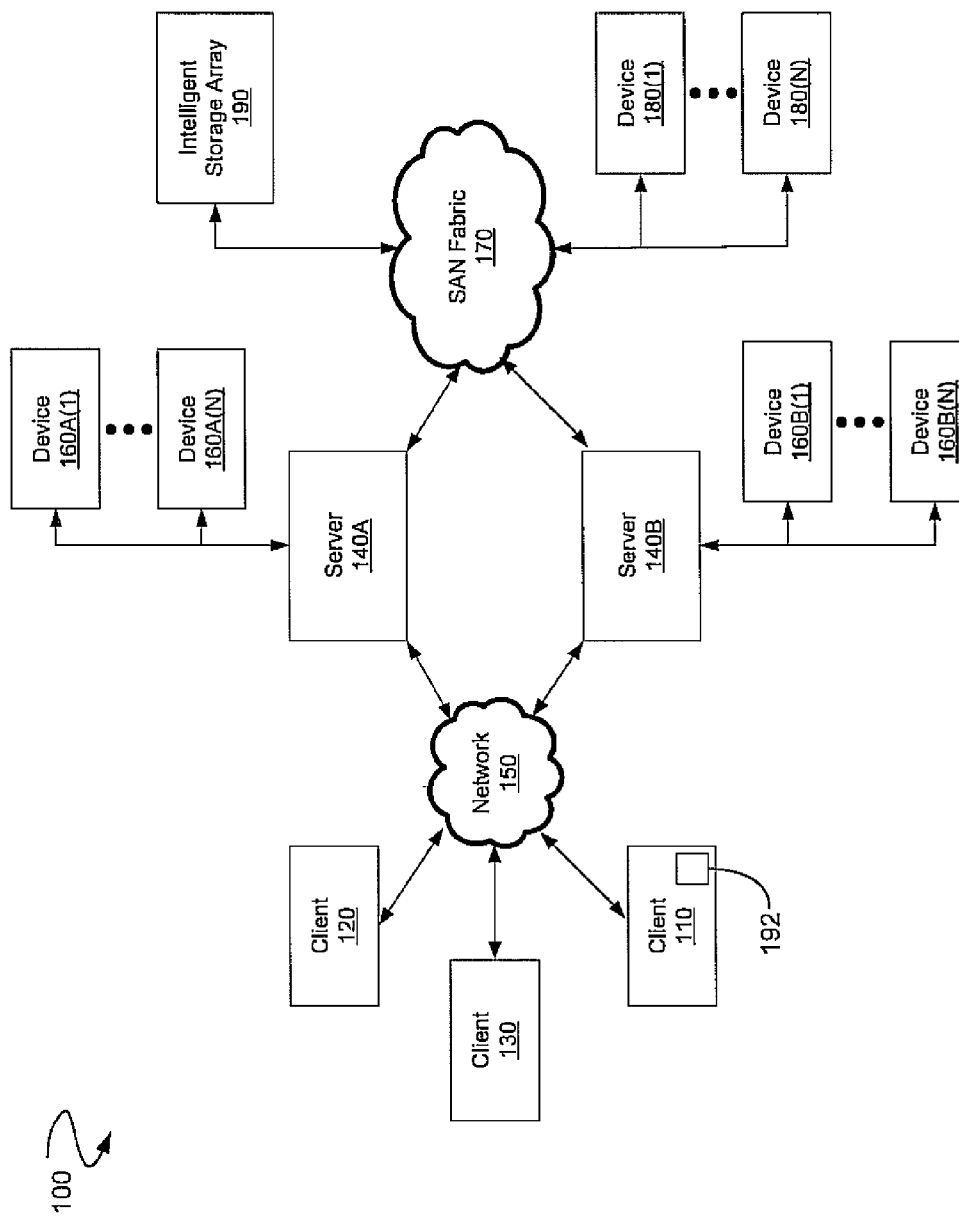
FIG. 1 is a block diagram depicting an exemplary network architecture that can serve as a platform for embodiments of the present invention.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "connected" refers to communicatively coupling elements via a bus, wireless connection (wifi), Bluetooth, infrared, USB, Ethernet, FireWire, optical, PCI, DVI, etc.

FIG. 1 is an exemplary system in which embodiments of the present invention can be implemented to accurately and automatically graphically represent anomalies in package and patch installations on servers. FIG. 1 is a block diagram depicting a network architecture 100 in which client systems 110, 120, and 130, as well as storage servers 140A and 140B (any of which can be implemented using computer system 200 (FIG. 2)), are coupled to a network 150. Storage server 140A is further depicted as having storage devices 160A(1)-(N) directly attached, and storage server 140B is depicted with storage devices 160B(1)-(N) directly attached. Servers 140A and 140B may contain a plurality of files that may be shared among a plurality of users. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120, and 130 via network 150. Intelligent storage array 190 is also shown as an example of a specific storage device accessible via SAN fabric 170.

With reference to computer system 200 (FIG. 2), modem 247 (FIG. 2), network interface 248 (FIG. 2), or some other method can be used to provide connectivity from each of client computer systems 110, 120, and 130 to network 150. Client systems 110, 120, and 130 of FIG. 1 are able to access information on storage server 140A or 140B using, for example, a web browser or other client software (not shown). Such a client allows client systems 110, 120, and 130 to access data hosted by storage server 140A or 140B or one of storage devices 160A(1)-(N), 160B(1)-(N), 180(1)-(N), or intelligent storage array 190. FIG. 1 depicts the use of a network such as the Internet or exchanging data, but the embodiments of the present invention are not limited to the Internet or any particular network-based environment. In the present embodiments, a method of anomaly identification 192 may be performed in one of the client computer systems 110, 130, and 130. However, the method of anomaly identification 192 is not limited to the client computer systems 110, 130, and 130, and may also operate within, for example, cloud computing environments.

Figure 2:
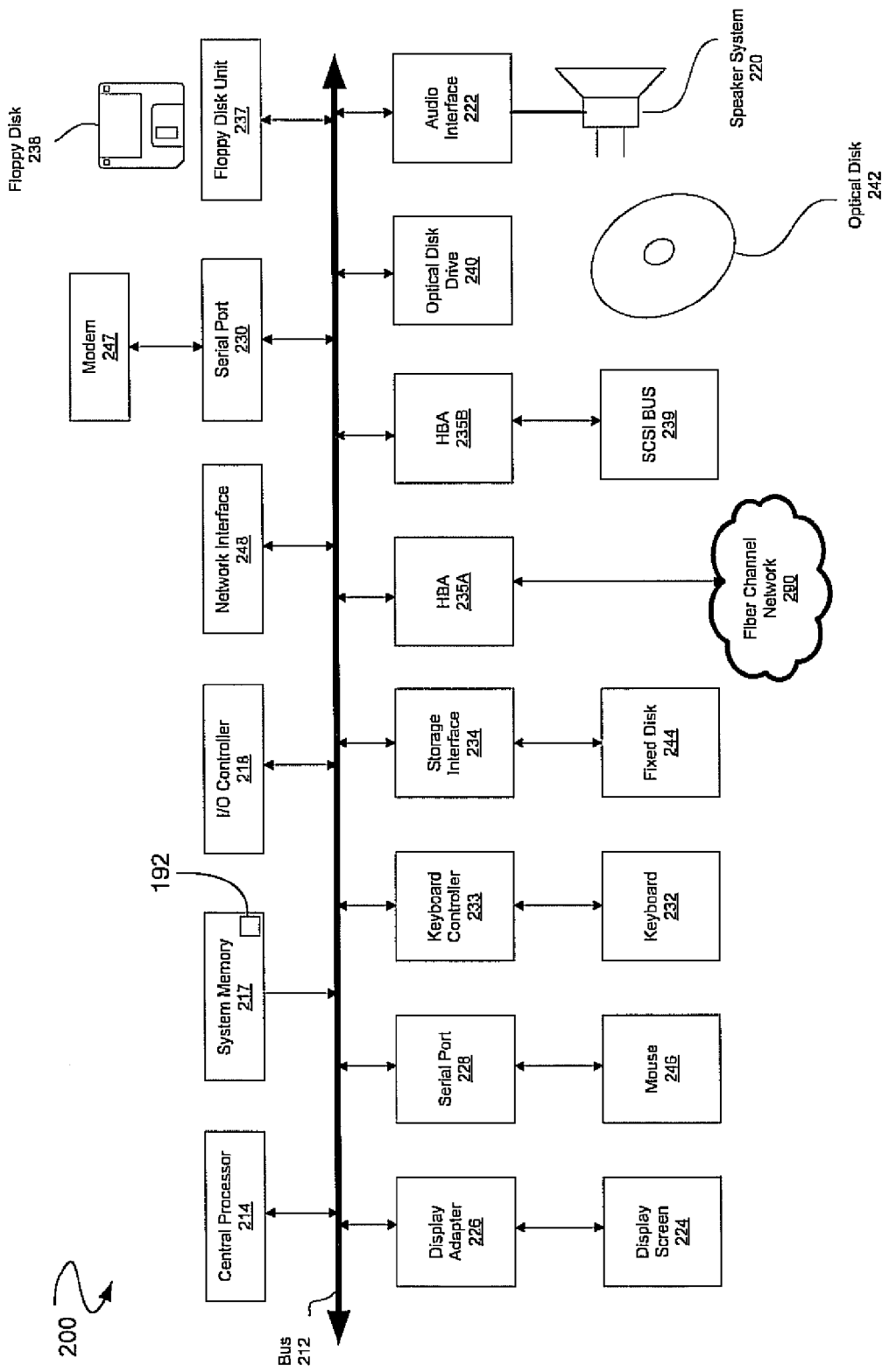
FIG. 2 is a block diagram depicting a computer system suitable for implementing embodiments of the present invention.

FIG. 2 depicts a block diagram of a computer system 200 suitable for implementing embodiments of the present invention. In the discussion to follow, various and numerous components and elements are described. Various combinations and subsets of those components can be used to implement the devices mentioned in conjunction with FIG. 1. For example, client systems 110, 120, and 130 may each be a full-function computer system that employs many, if not all, of the features of the computer system 200. However, the servers 140A and 140B may utilize only the subset of those features needed to support the functionality provided by those devices. For example, the servers 140A and 140B may not need a keyboard or display, and may execute a relatively sparse operating system that supports the functionality of data storage and data access and the management of such functionality.

Computer system 200 of FIG. 2 includes a bus 212 which interconnects major subsystems of computer system 200, such as a central processor 214, a system memory 217 (typically RAM, but which may also include ROM, flash RAM, or the like), an input/output controller 218, an optional external audio device, such as a speaker system 220 via an audio output interface 222, an optional external device, such as a display screen 224 via display adapter 226, serial ports 228 and 230, an optional keyboard 232 (interfaced with a keyboard controller 233), an optional storage interface 234, an optional floppy disk unit 237 operative to receive a floppy disk 238, an optional host bus adapter (HBA) interface card 235A operative to connect with a Fibre Channel network 290, an optional host bus adapter (HBA) interface card 235B operative to connect to a SCSI bus 239, and an optional optical disk drive 240 operative to receive an optical disk 242. Also, optionally included can be a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 200 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or network interface 248. In the current embodiment, the system memory 217 comprises instructions that when executed cause said system to perform the method of anomaly identification 192.

Storage interface 234, as with the other storage interfaces of computer system 200, can connect to a standard computer readable medium for storage and/or retrieval of information, such as fixed disk drive 244. Fixed disk drive 244 may be part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3A:
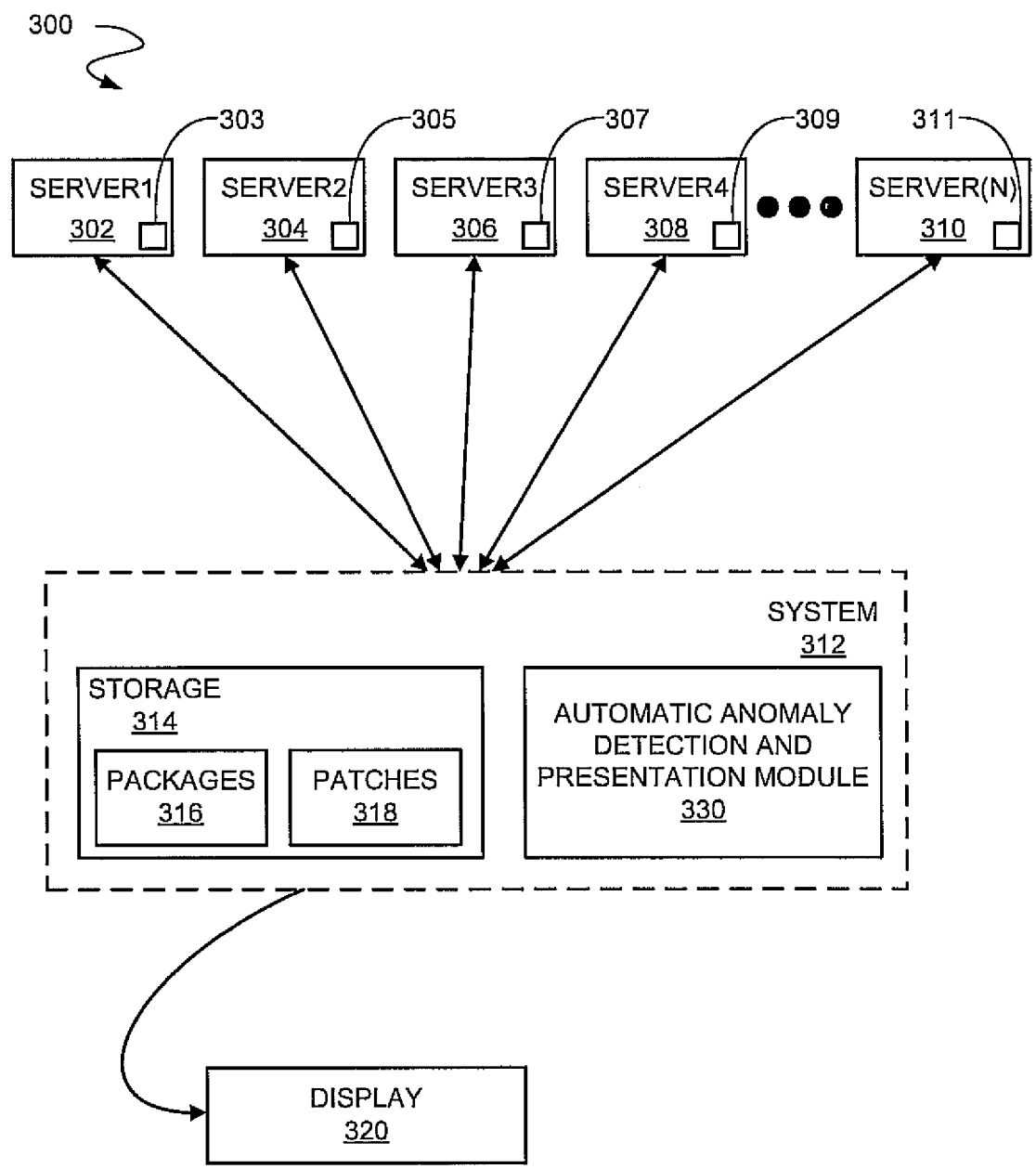
FIG. 3A is a block diagram depicting modules within an exemplary software installation anomaly identification process, according to an embodiment of the present invention.

FIG. 3A depicts a block diagram of an exemplary anomaly identification system 300, according to an embodiment of the present invention. Embodiments of the present invention provide methods and systems for automatically and accurately graphically representing installation anomalies in package and patch installations on several computer systems, e.g. servers. An anomaly is anything that is non-standard, for example a package and system combination that is in a minority.

System 312 has storage 314 with packages 316 and patches 318. Some of the packages 316 and patches 318 may have been installed on many servers including: Server1 302, Server2 304, Server3 306, Server4 308, . . . Server(N) 310. For example, Server1 302 has installed software 303, Server2 304 has installed software 305, Server3 306 has installed software 307, Server4 308 has installed software 309, . . . Server(N) 310 has installed software 311. Some of the systems may have non-standard installed software that is different. Non-standard installed software installations are anomalies on the servers need to be identified by system administrators.

The method of anomaly identification 192 in accordance with one embodiment collects or receives information from the servers and is operable within a module of anomaly identification 330. The information from the servers includes installations of the packages 316 and the patches 318 for each server. In one embodiment, the system 312 keeps a record of installations of the packages 316 and the patches 318 as they are installed on the servers. Alternatively, the system 312 can automatically query the servers regarding the particular installed packages, patches, and versions installed therein. Next, the module of anomaly identification 330 graphically represents the installations of the packages 316 and the patches 318 on a display 320. Thus, the graphical representation assists a server administrator to visualize the installations of the packages 316 and the patches 318 across all servers.

It will be appreciated that the exemplary anomaly identification system 300 is only an example of many uses for the module of anomaly identification 330 in accordance with embodiments of the present invention. Embodiments of the present invention can be used in any case where traits across multiple locations need to be identified and graphically visualized. For example, embodiments of the present invention can also be used for health checks, compliance metrics, programs, or tracking traits in other industries (e.g. tracking genetic information across a large population or tracking on-time arrival rates between airports).

Figure 3B:
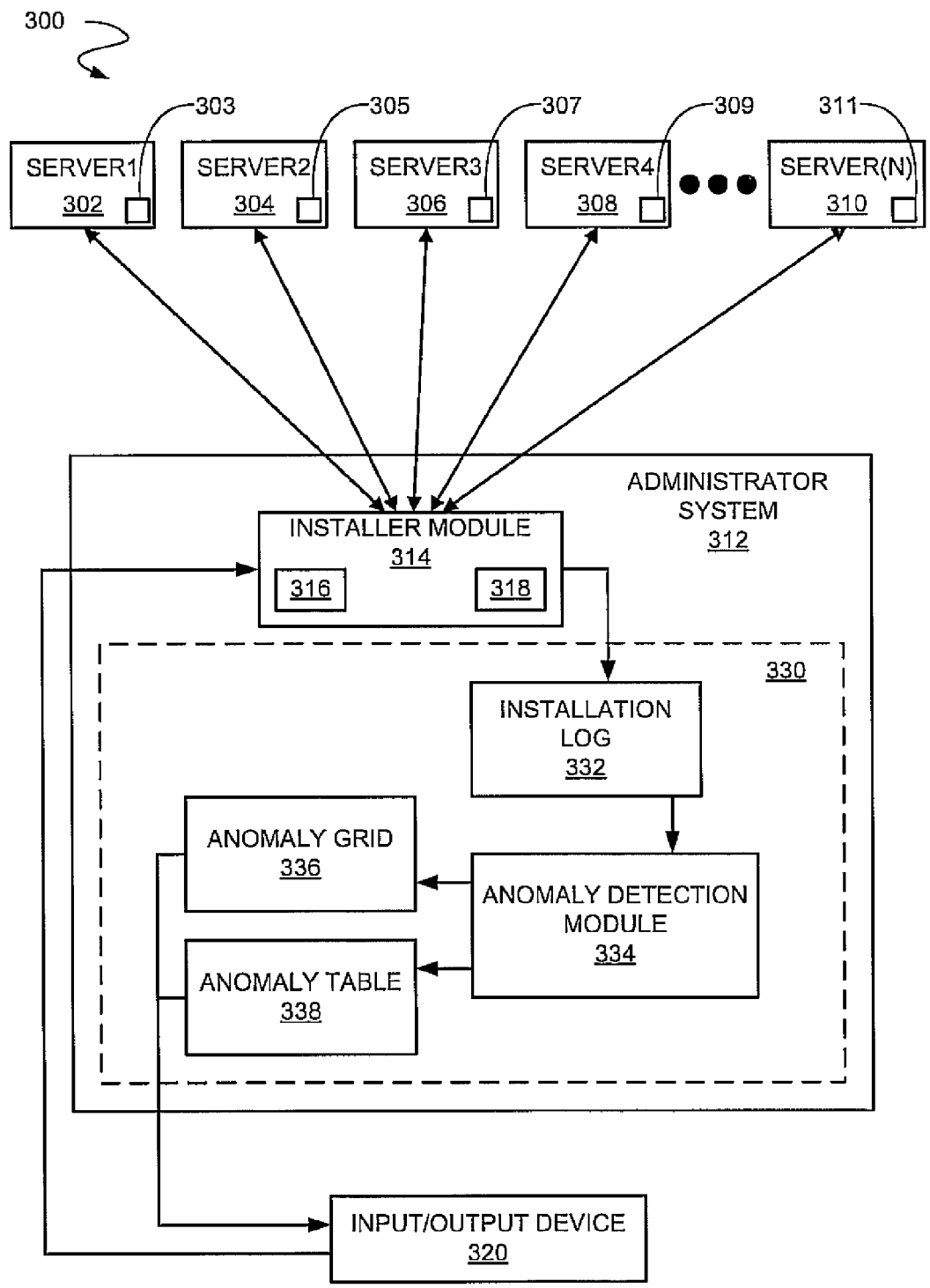
FIG. 3B is a block diagram depicting modules within an exemplary software installation anomaly identification process, according to an embodiment of the present invention.

FIG. 3B depicts a block diagram of an exemplary anomaly identification system 300, according to an embodiment of the present invention. Administrator system 312 has installer module 314 with packages 316 and patches 318. Some of the packages 316 and patches 318 may have been installed on many servers including: Server1 302, Server2 304, Server3 306, Server4 308, . . . Server(N) 310. For example, Server1 302 has installed software 303, Server2 304 has installed software 305, Server3 306 has installed software 307, Server4 308 has installed software 309, . . . Server(N) 310 has installed software 311. Some of the systems may have non-standard installed software that is different. Non-standard installed software installations are anomalies on the servers need to be identified by system administrators.

As the packages 316 and the patches 318 are installed on the servers, the installer module 314 transmits installation information to a module of anomaly identification 330. The module of anomaly identification 330 includes an installation log 332, an anomaly detection module 334, an anomaly grid 336, and an anomaly table 338. The module of anomaly identification 330 receives the installation information from the installer module 314. The installation information is stored in the installation log 332. The anomaly detection module 334 analyzes the installation log 332 and automatically identifies anomalous packages and systems.

The anomaly detection module 334 graphically represents the installations of the packages 316 and the patches 318 in the anomaly grid 336 and/or the anomaly table 338. A system administrator views the anomaly grid 336 and/or the anomaly table 338 on an input/output device 320. Thus, the anomaly grid 336 and the anomaly table 338 assist a server administrator to visualize the installations of the packages 316 and the patches 318 across all servers. The system administrator may make changes to the packages 316 and the patches 318 on the servers using the anomaly grid 336 and the anomaly table 338. In response to the system administrator, the installer module 314 updates selected servers and packages and transmits the changes to the module of anomaly identification 330.

It will be appreciated that the exemplary anomaly identification system 300 is only an example of many uses for the module of anomaly identification 330 in accordance with embodiments of the present invention. Embodiments of the present invention can be used in any case where traits across multiple locations need to be identified and graphically visualized.

Figure 3C:
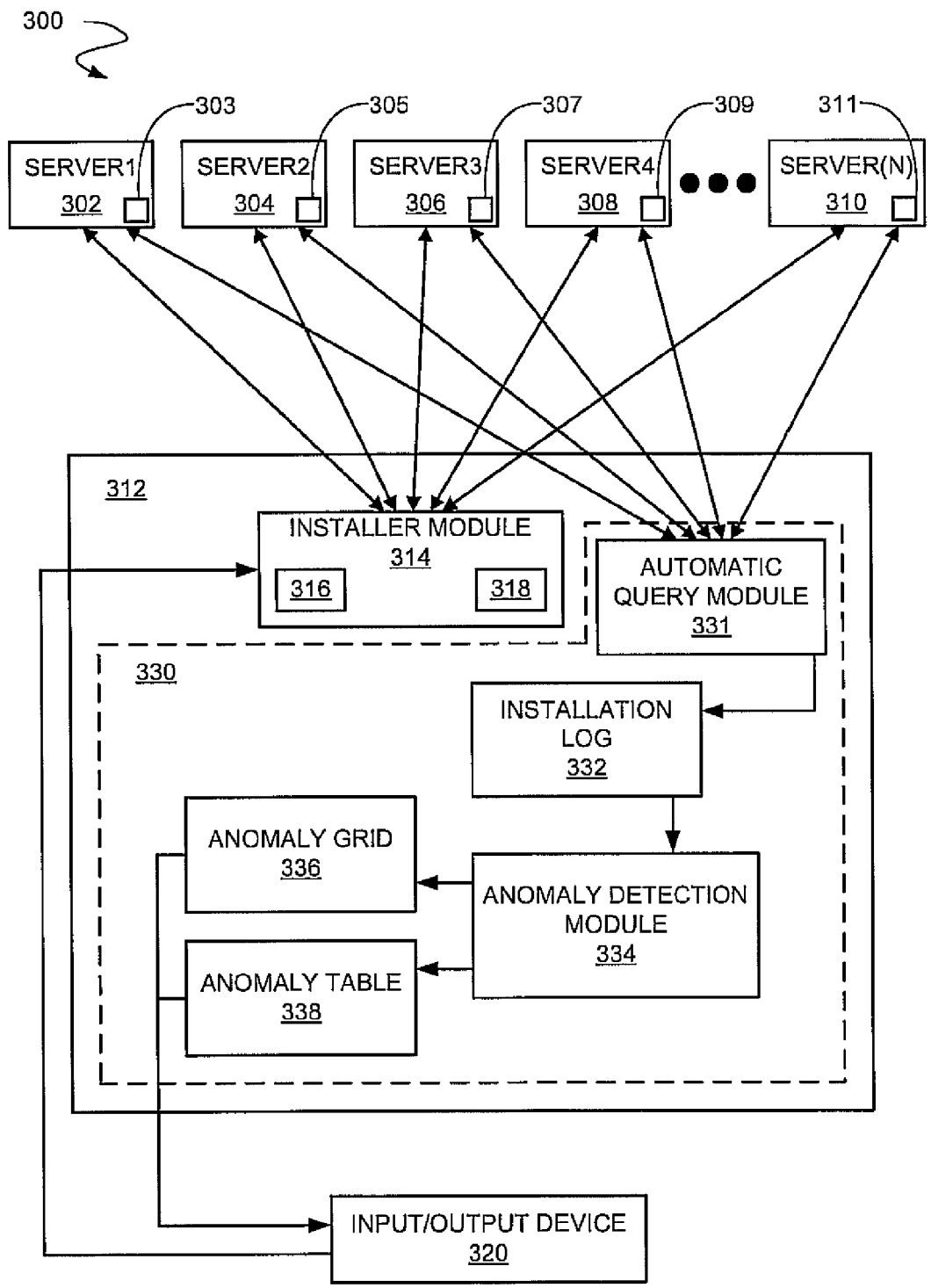
FIG. 3C is a block diagram depicting modules within an exemplary software installation anomaly identification process, according to an embodiment of the present invention.

FIG. 3C depicts a block diagram of an exemplary anomaly identification system 300, according to an embodiment of the present invention. Administrator system 312 has installer module 314 with packages 316 and patches 318. Some of the packages 316 and patches 318 may have been installed on many servers including: Server1 302, Server2 304, Server3 306, Server4 308, . . . . Server(N) 310. For example, Server1

302 has installed software 303, Server2 304 has installed software 305, Server3 306 has installed software 307, Server4 308 has installed software 309, . . . Server(N) 310 has installed software 311. Some of the systems may have non-standard installed software that is different. Non-standard installed software installations are anomalies on the servers need to be identified by system administrators.

The installer module 314 installs the packages 316 and the patches 318 on the servers. A module of anomaly identification 330 automatically collects package and patch installation information from the servers. The module of anomaly identification 330 includes an automatic query module 331, an installation log 332, an anomaly detection module 334, an anomaly grid 336, and an anomaly table 338. The automatic query module 331 automatically queries the servers to collect package and patch installation information. The automatic query module 331 transmits the installation information to the installation log 332. The installation log 332 stores the installation information. The anomaly detection module 334 analyzes the installation log 332 and automatically identifies anomalous packages and systems.

The anomaly detection module 334 graphically represents the installations of the packages 316 and the patches 318 in the anomaly grid 336 and/or the anomaly table 338. A system administrator views the anomaly grid 336 and/or the anomaly table 338 on an input/output device 320. Thus, the anomaly grid 336 and the anomaly table 338 assist a server administrator to visualize the installations of the packages 316 and the patches 318 across all servers. The system administrator may make changes to the packages 316 and the patches 318 on the servers using the anomaly grid 336 and the anomaly table 338. In response to the system administrator, the installer module 314 updates selected servers and packages and transmits the changes to the module of anomaly identification 330.

It will be appreciated that the exemplary anomaly identification system 300 is only an example of many uses for the module of anomaly identification 330 in accordance with embodiments of the present invention. Embodiments of the present invention can be used in any case where traits across multiple locations need to be identified and graphically visualized.

Figure 4A:
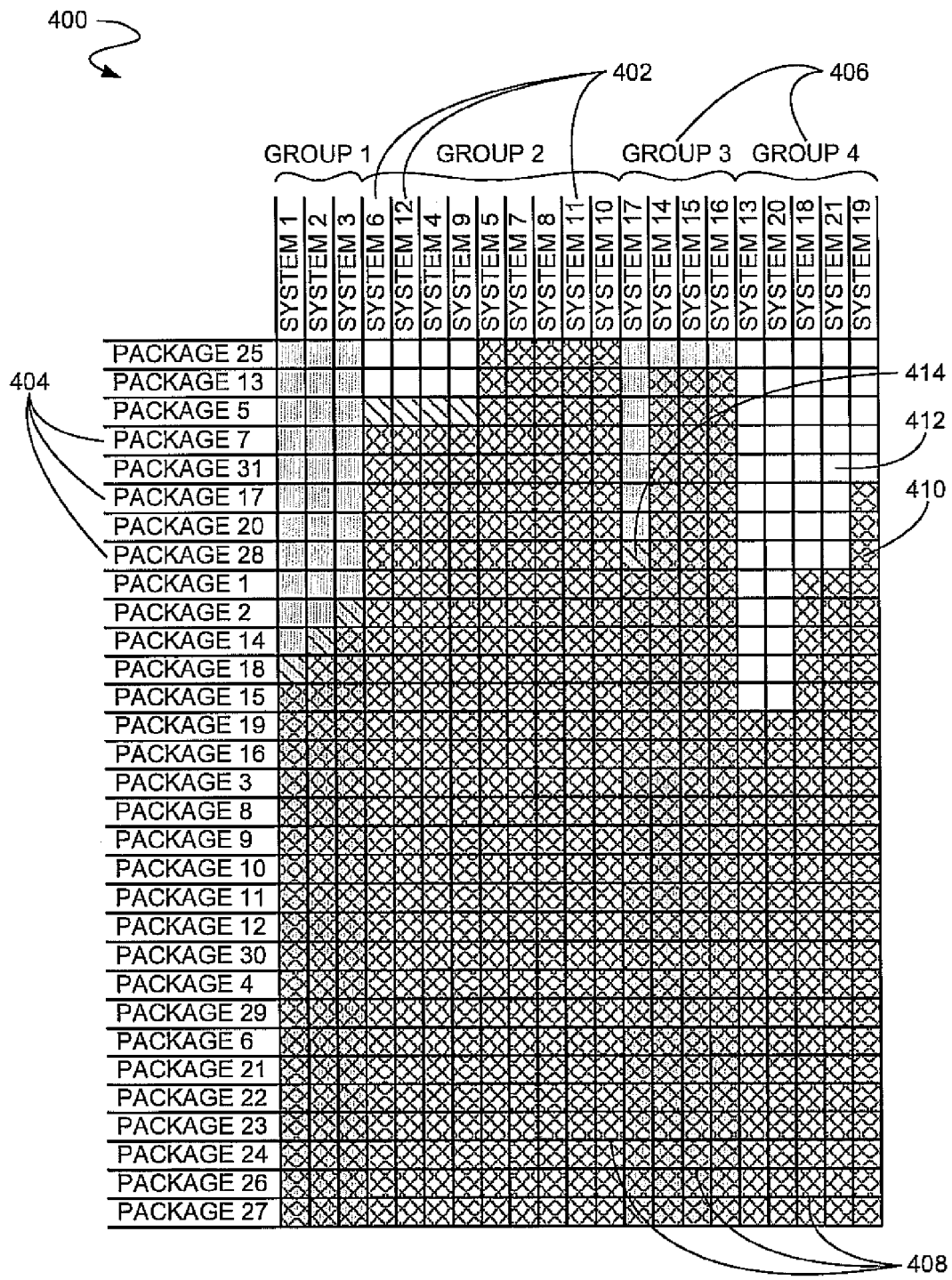
FIG. 4A is a displayable anomaly identification grid of a method of anomaly identification according to an embodiment of the present invention.

FIG. 4A depicts an exemplary anomaly identification grid 400 resultant from a method of anomaly identification 192, according to an embodiment of the present invention. The exemplary anomaly identification grid 400 is a graphical tool that helps a system administrator to quickly locate differences between servers and to fix issues that might be related to deployments on the servers. The module of anomaly identification 330 arranges servers 402 and packages 404 in a unique arrangement, making non-standard or anomalous systems within a group 406 visually stand out. Thus, system administrators can visually quickly identify what servers 402 might be non-compliant.

In an embodiment, the exemplary anomaly identification grid 400 displays the servers 402 horizontally, and the packages 404 are displayed vertically. However, in alternate embodiments the alignment of the servers 402 and the packages 404 may be switched. Each combination of the servers 402 and the packages 404 is represented as a cell 408 in the exemplary anomaly identification grid 400. The cells 408 are color coded to represent the status of the packages 404 installed on the servers 402. In an embodiment, a first color 410 is used for an installed package, a second color 412 is used for a not installed package, and a third color 414 is used for a version mismatched package. In alternate embodiments, any number of colors or patterns may be used to represent the status of various combinations on the exemplary anomaly identification grid 400.

In an embodiment, the servers 402 are arranged in the groups 406 according to clusters, business groups, geographical location, or user defined custom groupings. The groups 406 may be represented by the use of alternating bold and light colored cells or any other suitable distinguishing visual alternative. In addition, within a group 406, the servers 402 are arranged or sorted in horizontal position in order of the number of installed packages. For example, in one embodiment a server with the minimum number of installed packages is displayed on the extreme left of a group, and a server with the maximum number of installed packages is displayed on the extreme right of a group. Thus, servers arranged within a group increase in the number of installed packages from left to right. In alternate embodiments, this may be reversed and servers within a group may decrease in compliance from left to right. In addition, in cases where the number of the servers 402 is greater than can be accommodated on a display screen, pagination and/or tabbing or scrolling may be used to display different groups 406 on each page, with the same set of packages 404 on all pages.

Likewise, the packages 404 are arranged vertically in order of numbers of installations. Packages 404 that are installed on the least number of servers 402 are displayed at the top of the exemplary anomaly identification grid 400. Packages 404 that are installed on the most number of servers 402 are displayed at the bottom of the exemplary anomaly identification grid 400. Thus, the packages 404 increase in numbers of installations from top to bottom. In alternate embodiments, this may be reversed and packages 404 may decrease in numbers of installations from top to bottom. As with the arrangement of the servers 402, the packages 404 may be grouped (not shown) and arranged within groups (not shown) in order of numbers of installations. In addition, in cases where the number of the packages 404 is greater than can be accommodated on a display screen, pagination and/or tabbing or scrolling may be used to display different packages 404 on each page, with the same set of servers 402 on all pages.

It is appreciated that exemplary anomaly identification grid 400 can be visually rendered on a computer display and/or printed. In an embodiment, a printout of the anomaly identification grid 400 may be used as a work order, list, or accounting information used to prepare invoices. In the presentation grid, similar systems are generally displayed together, therefore within the grid, a system that deviates from the norm is visually depicted very effectively. As described more below, the system administrator may click on an individual cell to obtain more detailed information regarding the server-package combination represented by the cell.

Thus, in FIG. 4A the system administrator can quickly identify that Package 19 and all packages listed below Package 19 on the anomaly identification grid 400 are the same across all systems in all groups. The system administrator can also quickly identify that there are anomalies associated with Package 15 on systems in Group 4. In addition, the system administrator can quickly identify that all packages listed above Package 15 contain anomalies in a number of systems in a number of groups.

For example in Group 1, Package 18 on System 1, Package 14 on System 2, and Package 2 on System 3 are all version mismatched packages. Therefore, the system administrator may decide to update the version mismatched packages to a current version. In Group 2, Package 13 is installed on System 5, System 7, System 8, System 11, and System 10. However in Group 2, Package 13 is not installed on System 6, System 12, System 4, and System 9. Therefore, the system administrator may decide to install Package 13 on the systems without Package 13. Alternatively, the system administrator may decide to uninstall Package 13 from the Systems with Package 13.

Figure 4B:
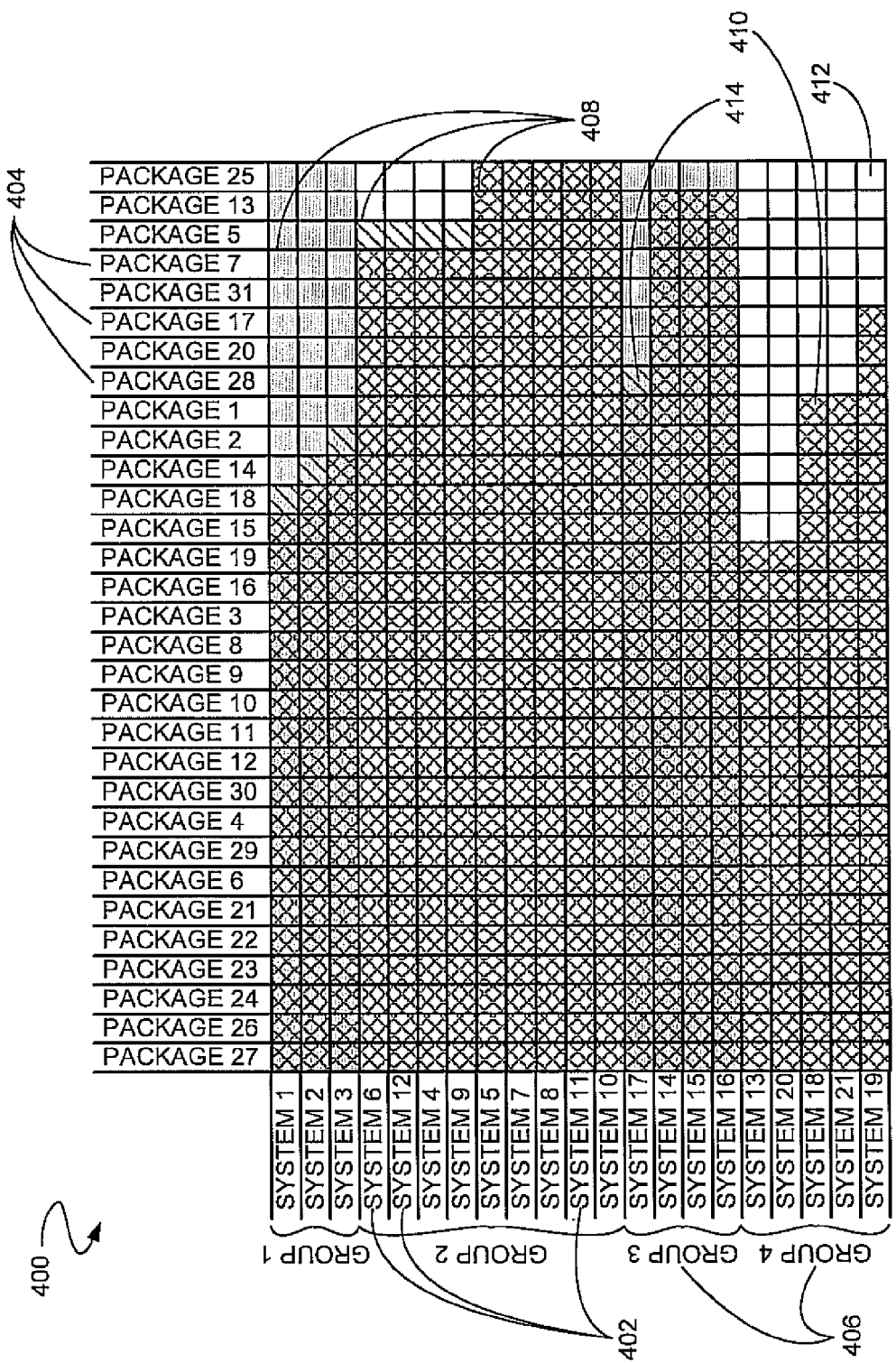
FIG. 4B is a displayable anomaly identification grid of a method of anomaly identification according to an embodiment of the present invention.

FIG. 4B depicts an exemplary anomaly identification grid 400 resultant from a method of anomaly identification 192, according to an embodiment of the present invention. The exemplary anomaly identification grid 400 is a graphical tool that helps a system administrator to quickly locate differences between servers and to fix issues that might be related to deployments on the servers. The module of anomaly identification 330 arranges servers 402 and packages 404 in a unique arrangement, making non-standard or anomalous systems within a group 406 visually stand out. Thus, system administrators can visually quickly identify what servers 402 might be non-compliant.

In an embodiment, the exemplary anomaly identification grid 400 displays the servers 402 vertically, and the packages 404 are displayed horizontally. However, in alternate embodiments the alignment of the servers 402 and the packages 404 may be switched. Each combination of the servers 402 and the packages 404 is represented as a cell 408 in the exemplary anomaly identification grid 400. The cells 408 are color coded to represent the status of the packages 404 installed on the servers 402. In an embodiment, a first color 410 is used for an installed package, a second color 412 is used for a not installed package, and a third color 414 is used for a version mismatched package. In alternate embodiments, any number of colors or patterns may be used to represent the status of various combinations on the exemplary anomaly identification grid 400.

In an embodiment, the servers 402 are arranged in the groups 406 according to clusters, business groups, geographical location, or user defined custom groupings. The groups 406 may be represented by the use of alternating bold and light colored cells or any other suitable distinguishing visual alternative. In addition, within a group 406, the servers 402 are arranged or sorted in vertical position in order of the number of installed packages. For example, in one embodiment a server with the minimum number of installed packages is displayed on the extreme top of a group, and a server with the maximum number of installed packages is displayed on the extreme bottom of a group. Thus, servers arranged within a group increase in the number of installed packages from top to bottom. In alternate embodiments, this may be reversed and servers within a group may decrease in compliance from top to bottom. In addition, in cases where the number of the servers 402 is greater than can be accommodated on a display screen, pagination and/or tabbing or scrolling may be used to display different groups 406 on each page, with the same set of packages 404 on all pages.

Likewise, the packages 404 are arranged horizontally in order of numbers of installations. Packages 404 that are installed on the least number of servers 402 are displayed at the right of the exemplary anomaly identification grid 400. Packages 404 that are installed on the most number of servers 402 are displayed at the left of the exemplary anomaly identification grid 400. Thus, the packages 404 increase in numbers of installations from right to left. In alternate embodiments, this may be reversed and packages 404 may decrease in numbers of installations from right to left. As with the arrangement of the servers 402, the packages 404 may be grouped (not shown) and arranged within groups (not shown) in order of numbers of installations. In addition, in cases where the number of the packages 404 is greater than can be accommodated on a display screen, pagination and/or tabbing or scrolling may be used to display different packages 404 on each page, with the same set of servers 402 on all pages.

Figure 5:
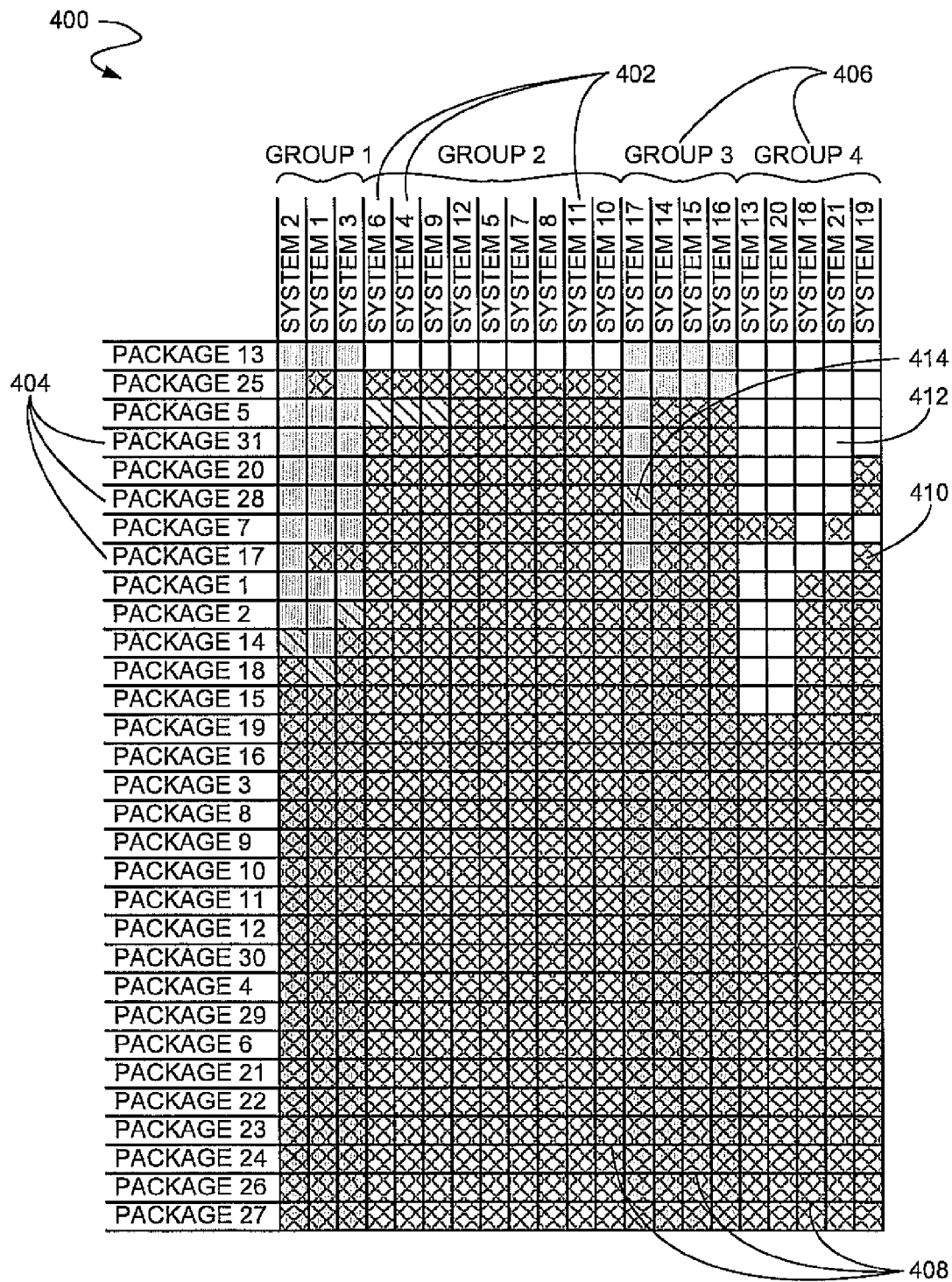
FIG. 5 is the displayable anomaly identification grid after a system administrator has installed some of the packages, uninstalled some of the packages, and updated some of the versions of the packages, according to an embodiment of the present invention.

FIG. 5 depicts the exemplary anomaly identification grid 400 after a system administrator has installed some of the packages 404, uninstalled some of the packages 404, and updated some of the versions of the packages 404, according to an embodiment of the present invention. In response to changes made by a system administrator, the exemplary anomaly identification grid 400 has been automatically updated by the module of anomaly identification 330. The packages 404 and the servers 402 have been reordered within the exemplary anomaly identification grid 400 according to the module of anomaly identification 330 to reflect the changes made by the system administrator.

For example, the system administrator has uninstalled Package 13 from System 5, System 7, System 8, System 11, System 10, System 14, System 15, System 16. In addition, the system administrator has made other changes, including installing Package 25 on System 1, updating Package 5 on System 12, installing Package 7 on System 13, etc. The exemplary anomaly identification grid 400 updates as the system administrator makes changes. For example, Package 13 is now listed at the top. In addition, systems have been reordered within groups. For example, the systems in Group 1 are now ordered from left to right: System 2, System 1, System 3. In an embodiment, the groups are not reordered. However, in an alternate embodiment the groups may be reordered according to numbers of anomalies within the groups.

Figure 6:
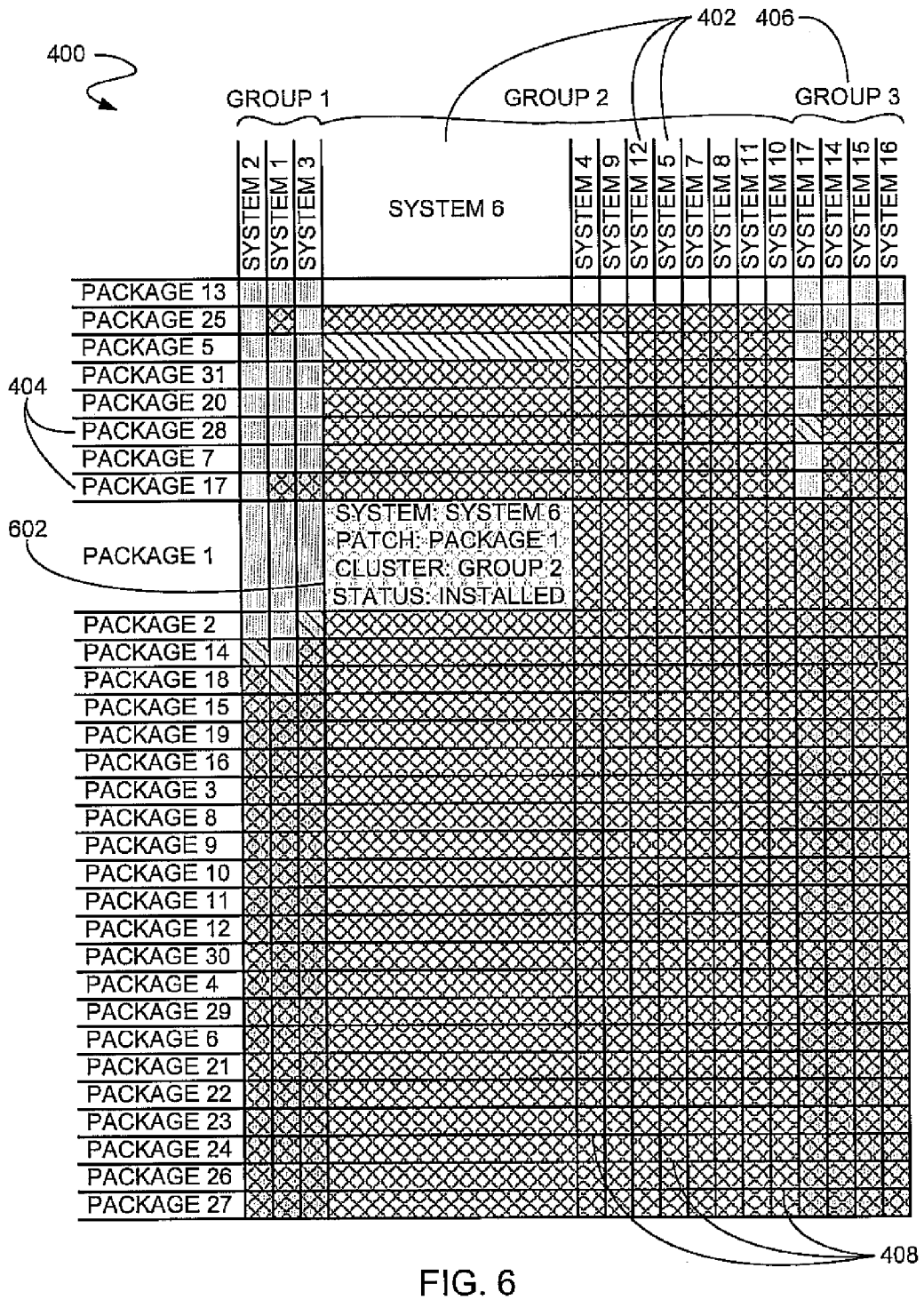
FIG. 6 is a portion of the displayable anomaly identification grid with a zoomed out cell, according to an embodiment of the present invention.

FIG. 6 depicts a portion of the anomaly identification grid 400 with a zoomed out cell 602, according to an embodiment of the present invention. In an embodiment, a system administrator may click on one of the cells 408, causing the cell 408 to zoom out to illustrate detailed information. In an embodiment, the zoomed out cell maintains the color coding.

The zoomed out cell 602 shows information unique to a particular server-package combination. Thus, the zoomed out cell 602 shows more detailed information, for example system, package, patch, and status details for the selected server-package combination. In addition, the zoomed out cell 602 may have links, for example install links, uninstall links, and links to object pages in the user interface.

For example, in FIG. 6 a system administrator has selected the cell corresponding to Package 1 on System 6 in Group 2. The cell has zoomed out and now displays detailed information regarding the Package 1-System 6 combination. For example, the zoomed out cell 602 displays that the system name is System 6, the installed patch name is Package 1, the cluster name is Group 2, and the status of Package 1 is installed In addition, the zoomed out cell may contain links or tools (not shown), usable by the system administrator. For example, the zoomed out cell 602 may have an uninstall link (not shown) or an update link (not shown). The system administrator may select the link to have a package uninstalled or updated.

Figure 7:
FIG. 7 is a displayable anomaly table, according to an embodiment of the present invention.

FIG. 7 depicts an exemplary displayed anomaly table 700, according to an embodiment of the present invention. The anomaly table 700 is a separate table that automatically lists anomalous systems 702 and anomalous packages 704 from the anomaly identification grid 400 (FIG. 6) in a tabular format. The anomaly table 700 may also show additional information, for example cluster names 706 and suggestions 708 to resolve the anomaly. In an embodiment, a printout of the anomaly table 700 may be used as a work order, list, or accounting information used to prepare invoices.

In an embodiment, the anomaly table 700 may be shown within (not shown) the anomaly identification grid 400 (FIG. 6). The anomaly table 700 may list all anomalies or user selectable parameters for display. For example a user may click on a row or column in the anomaly identification grid 400 (FIG. 6) to request a display of all of the anomalies in a selected row or column. In addition, the anomaly table 700 may contain links to assist in installing software. The suggestions 708 may contain install links, uninstall links, and links to object pages in the user interface.

For example, the anomaly table 700 lists System 1, System 12, System 5, System 14, and System 17. In order to visually aid the system administrator, the system rows are alternating like and dark backgrounds. System 1 is listed as an anomalous system within the cluster named Group 1. System 1 has been identified with an anomaly related to Package 25. The anomaly table 700 automatically provides a suggestion to resolve the anomaly. For example, the suggested resolution is to install Package 25 on System 1. The suggested install resolution may be a link that the system administrator can select in order to initiate the suggested resolution.

The system administrator may decide to accept the suggested resolution or resolve the anomaly differently. For example, System 12 in Group 2 is listed with an anomaly related to Package 5. The anomaly table 700 has suggested a resolution to upgrade Package 5. However, the system administrator may decide to resolve the anomaly by uninstalling Package 5 instead of upgrading Package 5.

Figure 8:
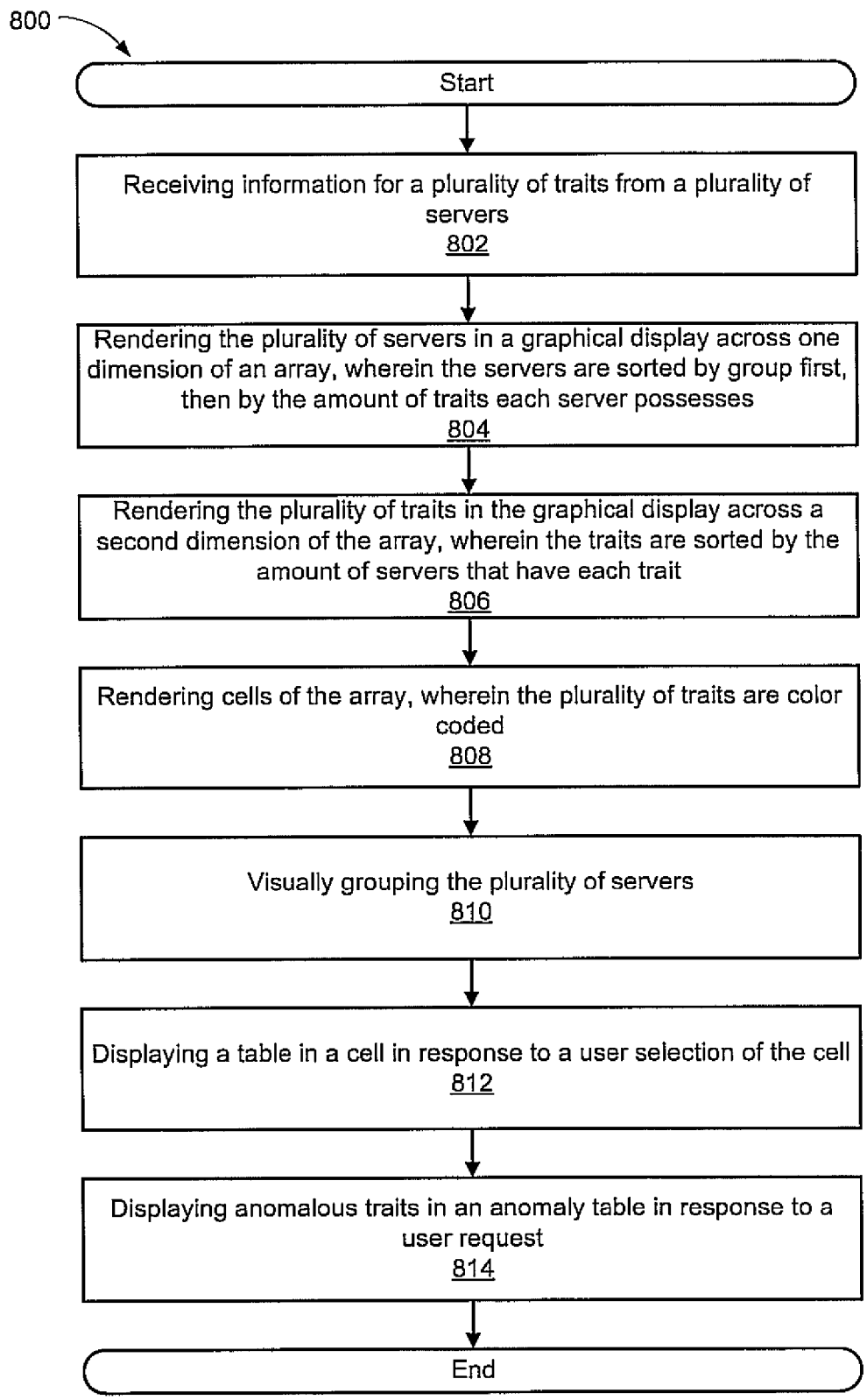
FIG. 8 is an exemplary computer controlled flow diagram of a method of anomaly identification according to an embodiment of the present invention.

FIG. 8 depicts a flowchart 800 of an exemplary method of anomaly identification according to an embodiment of the present invention. Although specific steps are disclosed in the flowchart 800, such steps are exemplary. That is, embodiments of the present invention are well-suited to performing various other steps or variations of the steps recited in the flowchart 800. The flowchart 800 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 802, information is received for a plurality of traits from a plurality of servers. For example, in FIG. 3B information is automatically collected by an administrator's system for a number of installations from a number of systems. As the installer module installs, updates, or uninstalls packages or patches, the information is automatically collected in an installation log within the module of anomaly identification. The collected information may include system, package, program, health check, and compliance metric information.

In a step 804, the servers are rendered in a graphical display, wherein a first server has fewer of the plurality of traits than a second server. The first server is positioned to one side of the second server based on respective numbers of traits had by the first and second servers. For example, in FIG. 4A representations of a plurality of systems are displayed on a two dimensional grid. A system with fewer of the plurality of installations is automatically displayed toward one side of a first dimension compared to a system with more of said plurality of installations. Thus, in FIG. 4A System 1 is displayed to the left of System 3.

In a step 806, the traits are rendered within the graphical display, wherein a first trait is on fewer of the plurality of servers than a second trait. The first trait is positioned to one side of the second trait based on respective numbers of systems having the first and second traits. For example, in FIG. 4A representations of a plurality of installations are displayed on the two dimensional grid. An installation on fewer of the plurality of systems is automatically displayed toward one side of a second dimension compared to an installation on more of the plurality of systems. Thus, in FIG. 4A Package 25 is displayed above Package 13.

In a step 808, the traits are color-coded. An installed trait is color-coded a first color, a trait that is not installed is color-coded a second color, and a version mismatched trait is color-coded a third color. For example, in FIG. 4A the grid is color-coded to represent the information for the plurality of installations. Thus, Package 27 on System 1 is represented by a cross-hatched cell, indicating a package that is installed. Package 25 on System 1 is represented by a clear cell, indicating a package that is not installed. Package 18 on System 1 is represented by a diagonally lined cell, indicating a version mismatched package.

In a step 810, the plurality of servers is visually grouped according to clusters, business groups, or user defined custom groupings. For example, in FIG. 4A the plurality of systems are visually grouped into a plurality of groups. Thus, System 1, System 2, and System 3 are grouped into Group 1. System 12, System 4, System 9, System 5, System 7, System 8, System 11 and System 10 are grouped into Group 2. System 17, System 14, System 15, and System 16 are grouped into Group 3. System 13, System 20, System 18, System 21, and System 19 are grouped into Group 4.

In a step 812, a table illustrating anomalies on the plurality of servers is automatically displayed in a cell in response to a user request. For example, in FIG. 6 additional information is displayed within a cell in the grid in response to user interaction. Thus, a system administrator has clicked on the cell corresponding to Package 1 on System 6. The cell has enlarged and now displays additional information in a table. The additional information in the table may contain system status, package status, links to object pages, install links, uninstall links, health checks, compliance metrics, etc. that are related to the user selected cell.

In a step 814, an anomalous trait is automatically identified and displayed in an anomaly table. For example, in FIG. 7 anomalous systems have been identified and displayed in a table. Thus, Package 25 in System 1 of Group 1 has been identified as an anomaly with a suggested install resolution. Package 13 in System 5 of Group 3 has been identified as an anomaly with a suggested uninstall resolution. Package 28 in System 17 of Group 3 has been identified as an anomaly with a suggested upgrade resolution.

Figure 9:
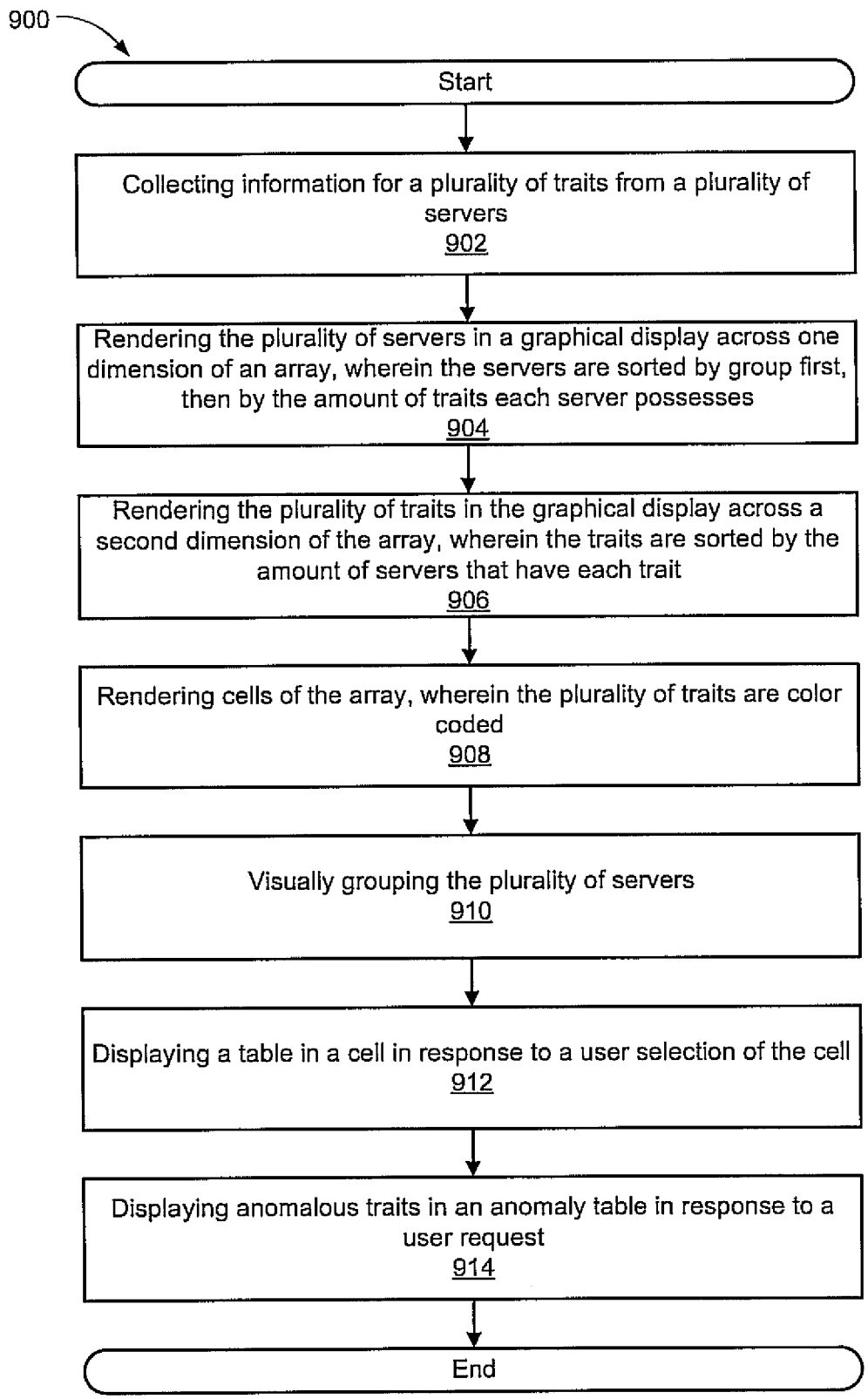
FIG. 9 is an exemplary computer controlled flow diagram of a method of anomaly identification according to an embodiment of the present invention.

FIG. 9 depicts a flowchart 900 of an exemplary method of anomaly identification according to an embodiment of the present invention. Although specific steps are disclosed in the flowchart 900, such steps are exemplary. That is, embodiments of the present invention are well-suited to performing various other steps or variations of the steps recited in the flowchart 900. The flowchart 900 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In a step 902, information is collected for a plurality of traits from a plurality of servers. For example, in FIG. 3C an automatic query module within the module of anomaly identification automatically collects information for a number of installations from a number of systems. The collected information may include system, package, program, health check, and compliance metric information.

In a step 904, the servers are rendered in a graphical display across one dimension of an array, wherein the servers are sorted by group first, then by the amount of traits each server possesses. The first server is positioned to one side of the second server along a first dimension based on respective numbers of traits had by the first and second servers. For example, in FIG. 4A representations of a plurality of systems are displayed on a two dimensional grid, wherein the plurality of systems are sorted along a first dimension. A system with fewer of the plurality of installations is automatically displayed toward one side of the first dimension compared to a second system having more of the plurality of installations. Thus, in FIG. 4A System 1 is displayed to the left of System 3.

In a step 906, the traits are rendered within the graphical display across a second dimension of the array, wherein the traits are sorted by the amount of servers that have each trait. The first trait is rendered to one side of the second trait along a second dimension based on respective numbers of systems having the first and second traits. For example, in FIG. 4A representations of a plurality of installations are displayed on the two dimensional grid, wherein the plurality of installations is sorted along a second dimension. A first installation which is on fewer of the plurality of systems is automatically displayed toward one side of the second dimension compared to a second installation which is on more of the plurality of systems. Thus, in FIG. 4A Package 25 is displayed above Package 13.

In a step 908, cells of the array are rendered, wherein the plurality of traits are color-coded. Within the array of cells, an installed trait is color-coded a first color, a trait that is not installed is color-coded a second color, and a version mismatched trait is color-coded a third color. For example, in FIG. 4A the matrix of cells is color-coded to represent the information for the plurality of installations. Thus, Package 27 on System 1 is represented by a cross-hatched cell, indicating a package that is installed. Package 25 on System 1 is represented by a clear cell, indicating a package that is not installed. Package 18 on System 1 is represented by a diagonally lined cell, indicating a version mismatched package.

In a step 910, the plurality of servers is visually grouped according to clusters, business groups, or user defined custom groupings. For example, in FIG. 4A the plurality of systems are visually grouped into a plurality of groups. Thus, System 1, System 2, and System 3 are grouped into Group 1. System 12, System 4, System 9, System 5, System 7, System 8, System 11 and System 10 are grouped into Group 2. System 17, System 14, System 15, and System 16 are grouped into Group 3. System 13, System 20, System 18, System 21, and System 19 are grouped into Group 4.

In a step 912, a table illustrating anomalies on the plurality of servers is automatically displayed in a cell in response to a user request. For example, in FIG. 6 additional information is displayed within a cell in the matrix of cells in response to user interaction with the grid. Thus, a system administrator has clicked on the cell corresponding to Package 1 on System 6. The cell has enlarged and now displays additional information in a table. The additional information in the table may contain system status, package status, links to object pages, install links, uninstall links, health checks, compliance metrics, etc. that are related to the user selected cell.

In a step 914, an anomalous trait is automatically identified and displayed in an entry of a table in response to a user request, wherein the entry further includes resolution of the anomalous trait. For example, in FIG. 7 anomalous systems have been identified and displayed in an entry in a table, wherein the entry also includes information for resolving the anomalous system. Thus, Package 25 in System 1 of Group 1 has been identified as an anomaly with a suggested install resolution. Package 13 in System 5 of Group 3 has been identified as an anomaly with a suggested uninstall resolution. Package 28 in System 17 of Group 3 has been identified as an anomaly with a suggested upgrade resolution.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of anomaly identification, said method comprising:
    collecting, using at least one computer processor, one or more installation logs;
    analyzing the one or more installation logs to identify a plurality of installations from a plurality of servers;
    displaying representations of said plurality of servers on a two dimensional grid, wherein said plurality of servers are sorted along a first dimension wherein a server with fewer of said plurality of installations is automatically displayed toward one side of said first dimension compared to a second server having more of said plurality of installations;
    displaying representations of said plurality of installations on said two dimensional grid, wherein said plurality of installations is sorted along a second dimension wherein a first installation which is on fewer of said plurality of servers is automatically displayed toward one side of said second dimension compared to a second installation which is on more of said plurality of servers;
    visually grouping said plurality of servers within said two dimensional grid according to business groups and arranged within each group of the business groups based on compliance metrics; and
    displaying a matrix of cells corresponding to intersections of said plurality of servers and said plurality of installations.

2. The method of claim 1 further comprising visually grouping representations of said plurality of servers into a plurality of groups.

3. The method of claim 1 further comprising color-coding said matrix of cells to represent said plurality of installations.

4. The method of claim 1 further comprising, in response to user interaction with said grid, displaying additional information within a cell in said matrix of cells.

5. The method of claim 4 wherein said displaying additional information comprises displaying at least one of system status, package status, links to object pages, install links, and uninstall links related to a user selected cell.

6. The method of claim 1 wherein said plurality of installations comprises at least one of a plurality of packages, a plurality of patches, and a plurality of programs.

7. The method of claim 1 further comprising:
    identifying an anomalous system;

displaying said anomalous system in an entry in a table wherein said entry also comprises information for resolving said anomalous system.

8. The method of claim 2, further comprising:
receiving information of a change in at least one of the plurality of servers;
updating said two dimensional grid to reflect the change by updating at least one of: an order of servers within a group of said plurality of groups wherein the order represents a sorted display of the servers within the group according to a number of installations, an order of the plurality of groups within said grid based on a number of anomalies within at least one of group of pluralities of groups, and an identified number of installations for particular software package 9. A method of characteristic presentation, said method comprising:
receiving one or more installation logs;
analyzing the one or more installation logs to identify a plurality of traits from a plurality of servers, wherein a first server of said plurality of servers has fewer of said plurality of traits than a second server of said plurality of servers, wherein a first trait of said plurality of traits is on fewer of said plurality of servers than a second trait of said plurality of traits, wherein said plurality of traits comprises at least one of software packages, health checks, compliance metrics, programs, and patches;
rendering, using at least one computer processor, a graphical display wherein said first server is positioned to one side of said second server along a first dimension based on respective numbers of traits had by said first and second servers;
rendering within said graphical display said first trait to one side second trait along a second dimension based on respective numbers of systems having said first and second traits;
visually grouping said plurality of servers within said graphical display according to business groups and arranged within each group of the business groups based on compliance metrics; and
rendering within said graphical display an array of cells corresponding to intersections of said plurality of servers and said plurality of traits.

10. The method of claim 9 further comprising visually grouping said plurality of servers according to clusters, or user defined custom groupings.

11. The method of claim 9 further comprising at least one of:
within said array of cells, color-coding an installed trait a first color;
within said array of cells, color-coding a trait that is not installed a second color; and
within said array of cells, color-coding a version mismatched trait a third color.

12. The method of claim 9 further comprising automatically displaying a table illustrating only severs of said plurality of servers which have anomalies, in response to a user request.

13. The method of claim 12 wherein said displaying said table comprises displaying at least one of health checks, compliance metrics, system status, package status, links to object pages, install links, and uninstall links.

14. The method of claim 9 further comprising:
identifying an anomalous trait; and
displaying said anomalous trait in an entry of a table wherein said entry further comprises resolution of said anomalous trait.

15. A system comprising:
a processor; and
memory coupled to the processor, wherein said memory comprises instructions that when executed cause said system to perform a method of anomaly identification, said method comprising:
collecting one or more installation logs;
analyzing the one or more installation logs to identify a plurality of installations from a plurality of servers;
displaying representations of said plurality of servers on a two dimensional grid, wherein said plurality of servers are sorted along a first dimension according to a respective amount of installations on each server;
displaying representations of said plurality of installations on said two dimensional grid, wherein said plurality of installations are sorted along a second dimension according to a respective amount of servers having each installation;
visually grouping said plurality of installation within said two dimensional grid according to business groups and arranged within each group of the business groups based on compliance metrics; and
displaying a plurality of cells corresponding to intersections of said plurality of servers and said plurality of installations.

16. The system of claim 15 wherein said method further comprises color-coding said plurality of cells to represent said information for said plurality of installations.

17. The system of claim 15 wherein said method further comprises, in response to user interaction with said grid, displaying additional information within a selected cell in said grid.

18. The system of claim 15 wherein said plurality of installations comprises at least one of a plurality of packages, a plurality of patches, and a plurality of programs.

19. The system of claim 15 wherein said method further comprises:
identifying an anomalous system; and
displaying said anomalous system in an entry in a table wherein said entry also comprises information for resolving said anomalous system.

* * * * *